(12) United States Patent
Yang et al.

(10) Patent No.: US 7,749,783 B2
(45) Date of Patent: Jul. 6, 2010

(54) METHOD OF FORMING A DISPLAY PANEL

(75) Inventors: Rong-Ching Yang, Hsin-Chu (TW);
Ming-Hung Wu, Hsin-Chu (TW);
Shih-Feng Hsu, Hsin-Chu (TW); Li-Ya Yeh, Hsin-Chu (TW); Kuo-Hwa Wu, Hsin-Chu (TW); Wei-Yi Chien, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 12/416,946

(22) Filed: Apr. 2, 2009

(65) Prior Publication Data
US 2010/0099211 A1 Apr. 22, 2010

(30) Foreign Application Priority Data
Oct. 17, 2008 (TW) .............................. 97139872 A

(51) Int. Cl.
*H01L 21/00* (2006.01)
(52) U.S. Cl. .............................. 438/30; 438/31; 438/32; 438/98; 438/151; 257/E21.151; 257/E21.338; 257/E21.585; 257/E21.586
(58) Field of Classification Search ............. 438/30–33, 438/98, 149–156; 257/E21.121, 131, 141, 257/151, 338, 585, 586
See application file for complete search history.

(56) References Cited

U.S. PATENT DOCUMENTS

| | | | |
|---|---|---|---|
| 5,032,009 A | | 7/1991 | Gibbons et al. |
| 5,508,832 A | * | 4/1996 | Shimada ..................... 349/189 |
| 5,528,401 A | | 6/1996 | Narutaki et al. |
| 5,668,651 A | * | 9/1997 | Yamada et al. .............. 349/156 |
| 6,072,557 A | * | 6/2000 | Kishimoto .................. 349/156 |
| 6,191,836 B1 | | 2/2001 | Woo et al. |
| 6,256,082 B1 | * | 7/2001 | Suzuki et al. ............... 349/144 |
| 6,320,634 B1 | * | 11/2001 | Winker et al. ............... 349/117 |
| 6,583,835 B1 | | 6/2003 | Yoshida et al. |
| 6,674,504 B1 | * | 1/2004 | Li et al. ....................... 349/169 |
| 6,822,712 B2 | * | 11/2004 | Suzuki et al. ............... 349/115 |
| 6,825,892 B2 | * | 11/2004 | Inoue et al. ................... 349/39 |

(Continued)

FOREIGN PATENT DOCUMENTS

JP 2004309780 A 11/2004

(Continued)

*Primary Examiner*—Michael S Lebentritt
(74) *Attorney, Agent, or Firm*—Winston Hsu

(57) ABSTRACT

A method of forming a display panel includes providing a first substrate having a transparent electrode, and a second substrate having a pixel electrode. Subsequently, an alignment material is provided and covers on the transparent electrode and/or the pixel electrode, and a photoelectric twisting layer is provided between the first substrate and the second substrate. The alignment material is first in a non-aligned state, and is radiation-polymerizable. The photoelectric twisting layer does not include any radiation-polymerizable material. Thereafter, a voltage difference is applied to drive molecules of the photoelectric twisting layer, and a radiating process is performed on the alignment material. The twisted molecules of the photoelectric twisting layer induce the surface molecules of the alignment material to arrange in an ordered state, and the alignment material is polymerized according to the ordered state as a first alignment film.

11 Claims, 12 Drawing Sheets

U.S. PATENT DOCUMENTS

| | | | |
|---|---|---|---|
| 6,897,924 B2 * | 5/2005 | Tashiro et al. | 349/113 |
| 6,937,300 B2 * | 8/2005 | Inoue et al. | 349/93 |
| 7,113,241 B2 * | 9/2006 | Hanaoka | 349/139 |
| 7,262,824 B2 * | 8/2007 | Sasabayashi et al. | 349/129 |
| 7,327,433 B2 * | 2/2008 | Miyachi et al. | 349/169 |
| 7,378,124 B2 * | 5/2008 | Daniels | 427/66 |
| 7,662,009 B2 * | 2/2010 | Ogawa | 445/24 |
| 2004/0109954 A1 * | 6/2004 | Ogawa et al. | 428/1.1 |

FOREIGN PATENT DOCUMENTS

JP     2006-317866     11/2006

* cited by examiner

|  | Layout design (1) | | | Layout design (2) | | |
|---|---|---|---|---|---|---|
|  | Turn-on response time (s) | Turn-off response time (s) | Total response time (s) | Turn-on response time (s) | Turn-off response time (s) | Total response time (s) |
| Test sample (1) Before exposing | 19.8 | 5.29 | 25.09 | 19.02 | 5.1 | 24.12 |
| Test sample (1) Exposing for 1 second | 11.76 | 5.29 | 17.05 | 11.37 | 5.29 | 16.66 |
| Test sample (2) Before exposing | 19.22 | 5.29 | 24.51 | 18.04 | 5.29 | 23.33 |
| Test sample (2) Exposing for 2 second | 11.57 | 5.29 | 16.86 | 11.37 | 5.29 | 16.66 |

|  | Layout design (3) | | | Layout design (4) | | |
|---|---|---|---|---|---|---|
|  | Turn-on response time (s) | Turn-off response time (s) | Total response time (s) | Turn-on response time (s) | Turn-off response time (s) | Total response time (s) |
| Test sample (1) Before exposing | 18.04 | 4.9 | 22.94 | 16.67 | 4.9 | 21.57 |
| Test sample (1) Exposing for 1 second | 11.57 | 5.29 | 16.86 | 11.18 | 5.29 | 16.47 |
| Test sample (2) Before exposing | 16.08 | 5.1 | 21.18 | 16.86 | 5.1 | 21.96 |
| Test sample (2) Exposing for 2 second | 12.75 | 5.1 | 17.85 | 10.98 | 5.29 | 16.27 |

FIG. 12

METHOD OF FORMING A DISPLAY PANEL

BACKGROUND OF THE INVENTION

1. Field of the Invention

The present invention relates to a method of forming a display panel and, more particularly, to a method of forming a display panel that uses twisted molecules of the photoelectric twisting layer to induce surface molecules of the alignment material to arrange in an ordered state, and the alignment material is polymerized according to the ordered state to form an alignment film

2. Description of the Prior Art

Liquid crystal display (LCD) can control brightness or hue of its displaying pixels by twisting the liquid crystal molecules. That is because the liquid crystal molecules with different twisting angles allow different light-penetrations for various colorful images. Usually, alignment films are included in the LCD to pre-tilt the nearby liquid crystal molecules, so the twisting direction of the liquid crystal molecules can be well controlled in the pixels. For forming the alignment films, a traditional aligning method called a rubbing alignment treatment is adopted in common.

The rubbing alignment treatment includes a step of coating the thin film transistor (TFT) substrate and the color filter (CF) substrate respectively with alignment material before the TFT substrate and the CF substrate are combined with each other, and a step of rubbing the alignment material, which covers the TFT substrate and the CF substrate, with a roller having nap (fluff). In other words, the rubbing alignment treatment is performed on semi-finished substrates (half-finished substrates or unfinished substrates), such as the semi-finished TFT substrate and the semi-finished CF substrate, which are not assembled. Nevertheless, the rubbing alignment has shortcomings of falling dusts from the roller, causing abnormal stress, probably forming some un-uniform alignment, and so on. Thus, non-contact type alignment treatments, such as a photo alignment treatment, an ion beam alignment treatment and a plasma beam alignment treatment, are aggressively developed. However, the above-mentioned non-contact type alignment treatments are still carried out on the semi-finished substrates (half-finished substrates or unfinished substrates) before the TFT substrate and the CF substrate are combined with each other. The fabricating method including a non-contact type alignment treatment is described in detail as following.

Referring to FIG. 1 through FIG. 4 schematically illustrate a method of forming a multi-domain vertical alignment (MVA) liquid crystal display panel by utilizing a prior art photo alignment treatment, where FIG. 2 is a cross-sectional diagram of the glass substrate shown in FIG. 1. As shown in FIG. 1 and FIG. 2, a glass substrate 12 and a conductive layer 14 disposed on the inner surface of the glass substrate 12 are first provided. A plurality of pixel regions 16 are defined on the glass substrate 12. For clarity, only one pixel region 16 is shown in FIG. 1 and FIG. 2, and some components are not marked in both FIG. 1 and FIG. 2. The glass substrate 12 is a semi-finished substrate (half-finished substrate or unfinished substrate), and a first alignment region 18a, a second alignment region 18b, a third alignment region 18c and a fourth alignment region 18d can be further defined in each pixel region 16.

Thereafter, the glass substrate 12 is coated with an alignment material 20, which is radiation-polymerizable and has molecules arranging in a non-aligned state (non-ordered state). In order to form an alignment film having different pre-tilt angles in the first, second, third and fourth alignment regions 18a, 18b, 18c, 18d, four exposing processes have been performed on the alignment material 20 disposed in the first, second, third and fourth alignment regions 18a, 18b, 18c, 18d respectively. As shown in FIG. 1 and FIG. 2, a first exposing step is performed, where the second, third and fourth alignment regions 18b, 18c, 18d are shielded by a mask 22, and the first alignment region 18a is exposed by the mask 22. Wherein the mask 22 has a shield material (unshown) and is disposed on the transparent substrate (unshown) to define transmission region (unshown) and shielding region (unshown) in one pixel, the transmission region is corresponding to predetermined region (such as the first alignment region 18a) radiated by polarized light or parallel light 24, and the shielding region is corresponding to other regions (such as the second, third and fourth alignment regions 18b, 18c, 18d), and the mask 24 is not in contact with the alignment material 20. The alignment material 20 disposed in the first alignment region 18a is radiated by polarized light or parallel light 24 that has an tilt angle of 45 degree (45°) to the glass substrate 12.

As shown in FIG. 3, the second, third and fourth exposing steps are performed one after another to radiate the alignment material 20 disposed in the second, third and fourth alignment region 18b, 18c, 18d with polarized light or parallel light 24 that has an tilt angle of 135°, 225° and 315° to the glass substrate 12 respectively. As shown in FIG. 4, the parallel light or polarized light 24 having a particular direction induces superficial molecule of the alignment material 20 orient along a predetermined direction, and the parallel light or polarized light 24 can polymerize the alignment material 20 in the meantime to turn the alignment material 20 into an alignment film 26. Therefore, the alignment film 26 has different pre-tilt directions 28 in the first, second, third and fourth alignment regions 18a, 18b, 18c, and 18d respectively.

Although the photo alignment treatment reduces the shortcomings of dusts from the roller, abnormal stress and un-uniform alignment, the photo alignment treatment still has a disadvantage of expensive equipment cost. For providing the parallel light or polarized light 24, exquisite lens system in the photo alignment equipment is needed. Accordingly, if a larger area (larger size substrate such as 800 mm*500 mm) should be exposed in an exposing process, an exquisite lens system having a great aperture is required in the photo alignment equipment. However, an exquisite lens system having a great aperture usually takes a lot of expenses.

Furthermore, a plurality of exposing steps are needed to form one alignment film of a multi-domain alignment structure for various pre-tilt angles in one semi-finished substrate (half-finished substrate or unfinished substrate). The numerous exposing steps not only increase the cycle time and complexity of manufacturing the product, but also needs additional cost for the photo masks. In addition, the product structure and the product design are great limited by the precision of radiating the light, the precision of orient the exposing target, the precision of aligning the photo mask, and so on, due to the numerous exposing steps.

Moreover, the photo alignment treatment is still carried out on the alignment material covering the semi-finished substrates (half-finished substrates or unfinished substrates) before the TFT substrate and the CF substrate are assembled. Therefore, although the falling dusts from the roller is avoided, the photo alignment treatment still has a shortcoming of falling dusts from surrounding, and the dusts may cause problems, such as bright dots, dark dots, etc.

SUMMARY OF THE INVENTION

It is therefore one of the objectives of the present invention to provide a method of forming a display panel and a related alignment film to solve the aforementioned problem.

According to the present invention, a method of forming a display panel is provided. The method includes the following steps. First, a first substrate is provided, and the first substrate has a transparent electrode thereon as an inner surface. Subsequently, a second substrate is provided. The second substrate has a pixel electrode thereon as an inner surface and corresponds to the first substrate. Next, an alignment material covering one of the transparent electrode and the pixel electrode is formed. The alignment material is radiation-polymerizable and in a non-aligned state. Furthermore, a photoelectric twisting layer is provided between the first substrate and the second substrate, and the photoelectric twisting layer includes non-radiation-polymerizable materials. Next, a voltage difference is applied between the transparent electrode and the pixel electrode to twist a plurality of molecules of the photoelectric twisting layer, so that the molecules of the photoelectric twisting layer induce a plurality of superficial molecules of the alignment material to arrange in an ordered state. Following that, an exposing process is performed on the alignment material to polymerize the alignment material in the ordered state and to turn the alignment material into a first alignment film. Therefore, the superficial molecules of the first alignment film molecule keeps in the ordered state without applying the voltage difference.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 12 schematically illustrates a comparison table showing the response time test result of the alignment films formed in the present invention.

DETAILED DESCRIPTION

To provide a better understanding of the presented invention, preferred embodiments will be made in details. The preferred embodiments of the present invention are illustrated in the accompanying drawings with numbered elements.

Figure 1:
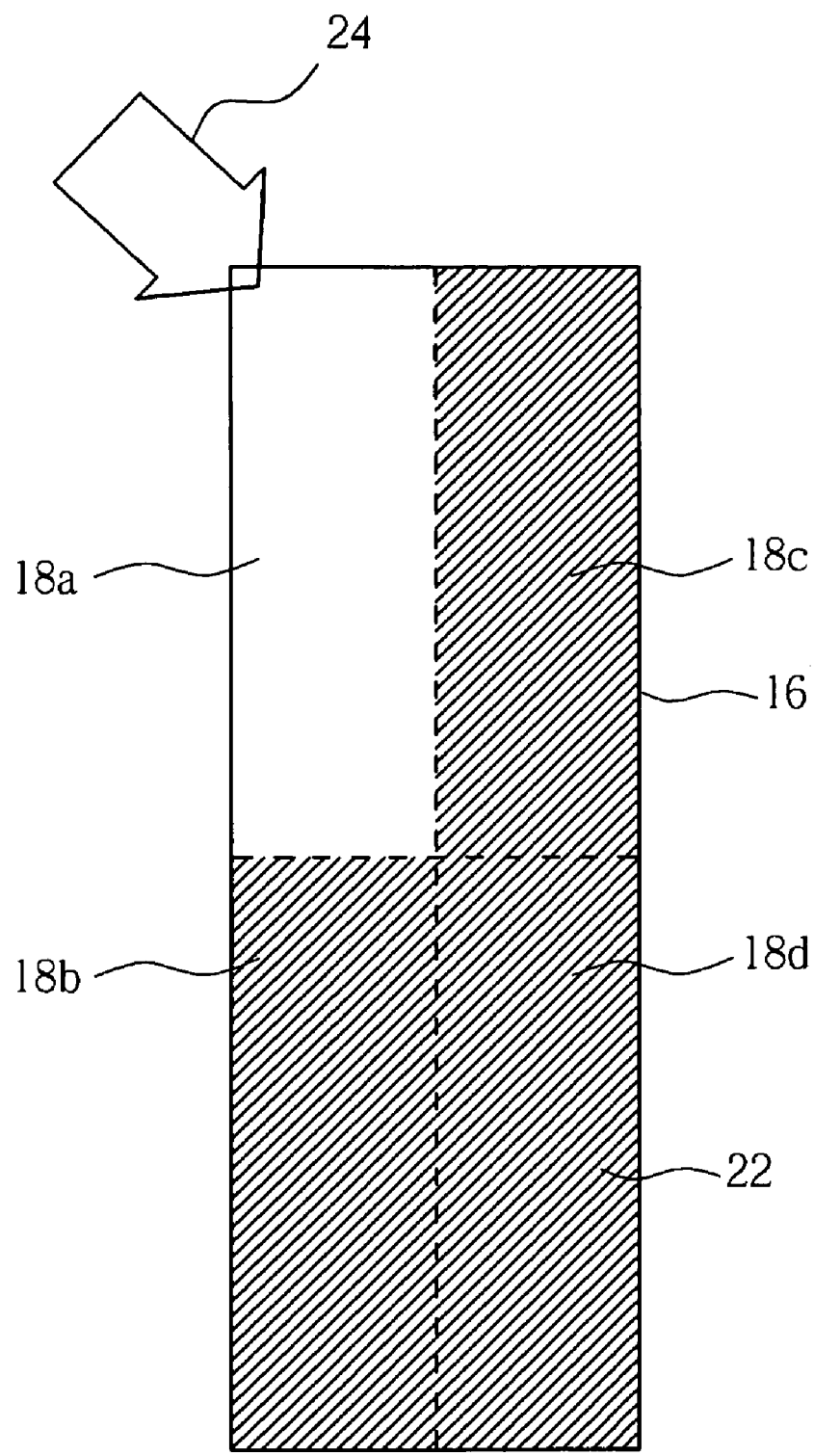
FIG. 1 through FIG. 4 schematically illustrate a method of forming a MVA liquid crystal display panel by utilizing a prior art photo alignment treatment.
Figure 2:
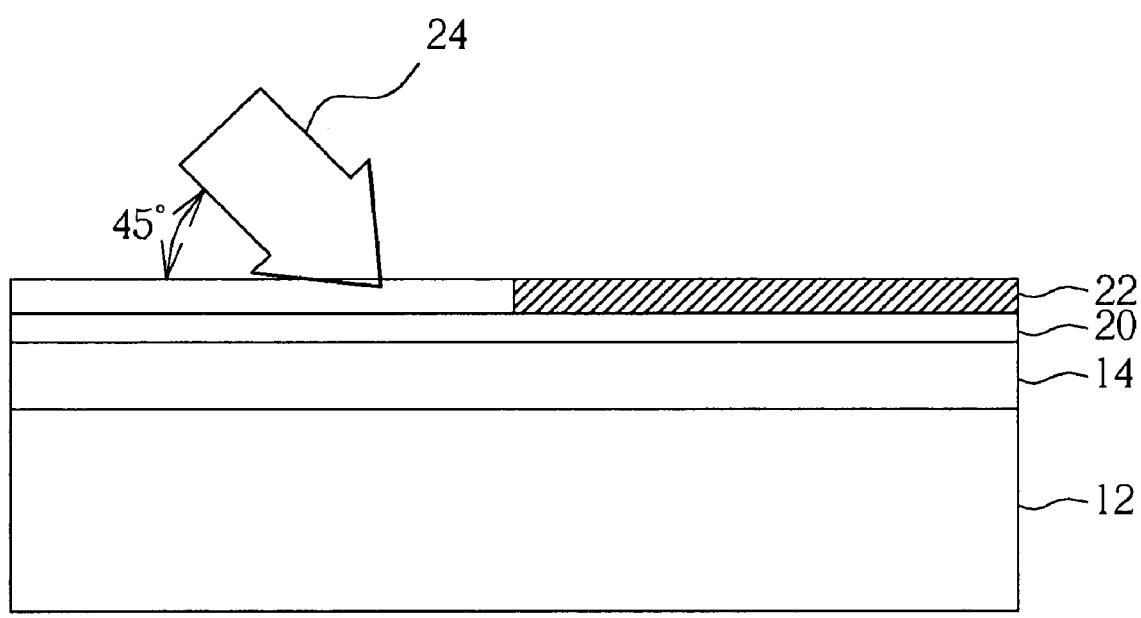
Figure 3:
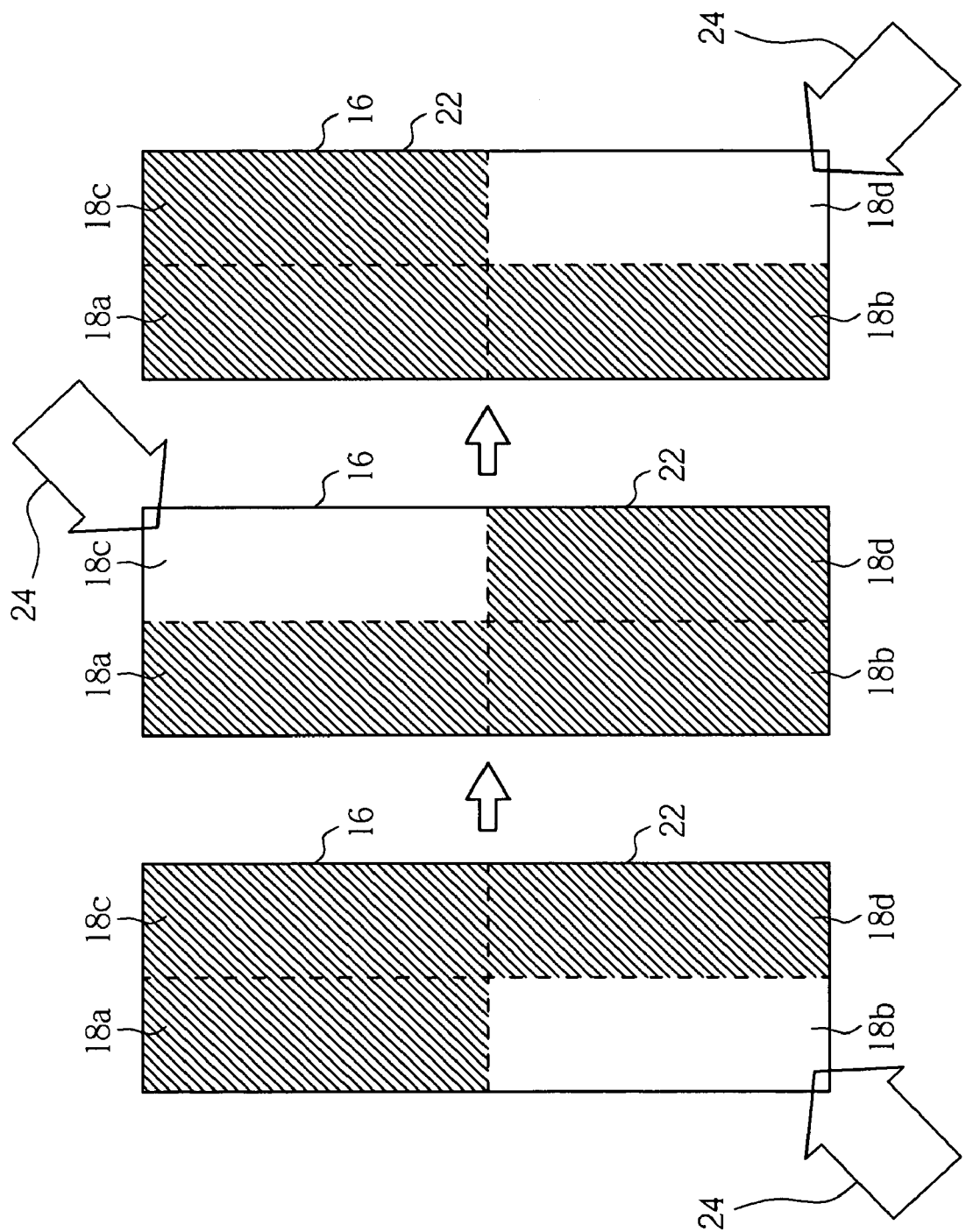
Figure 4:
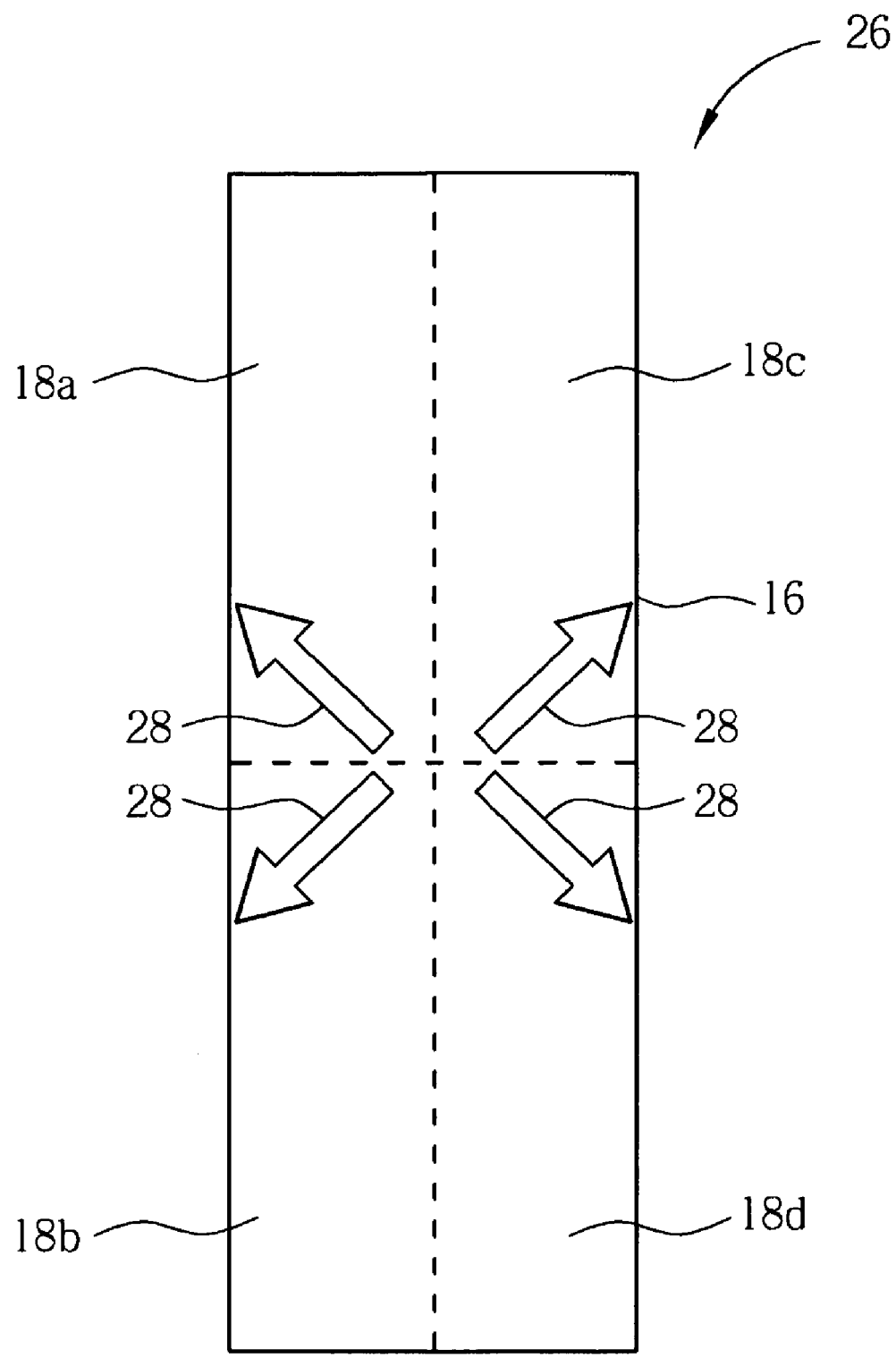
Figure 5:
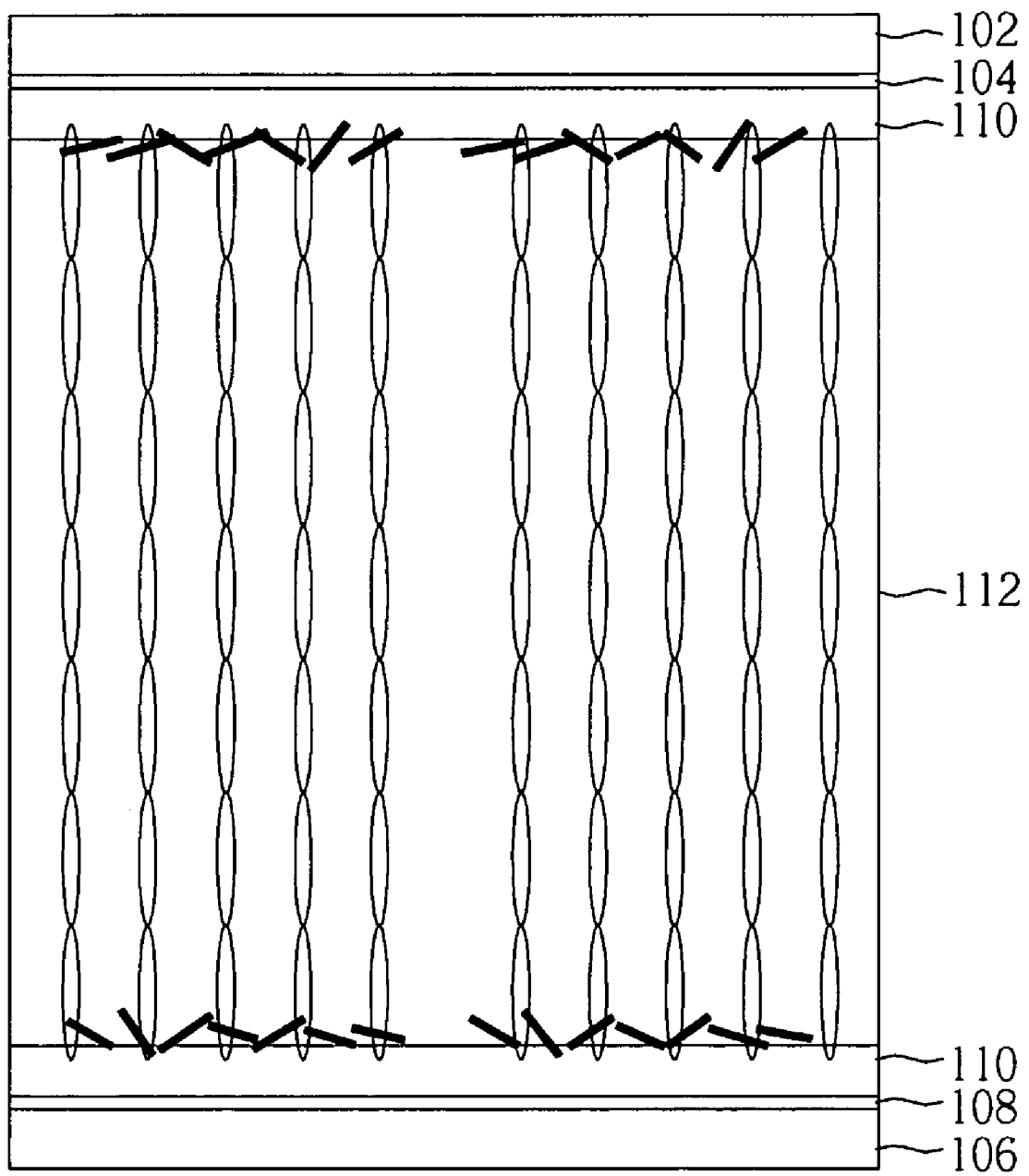
FIG. 5 through FIG. 7 schematically illustrate a method of forming a display panel in accordance with one preferred embodiment of the present invention.
Figure 6:
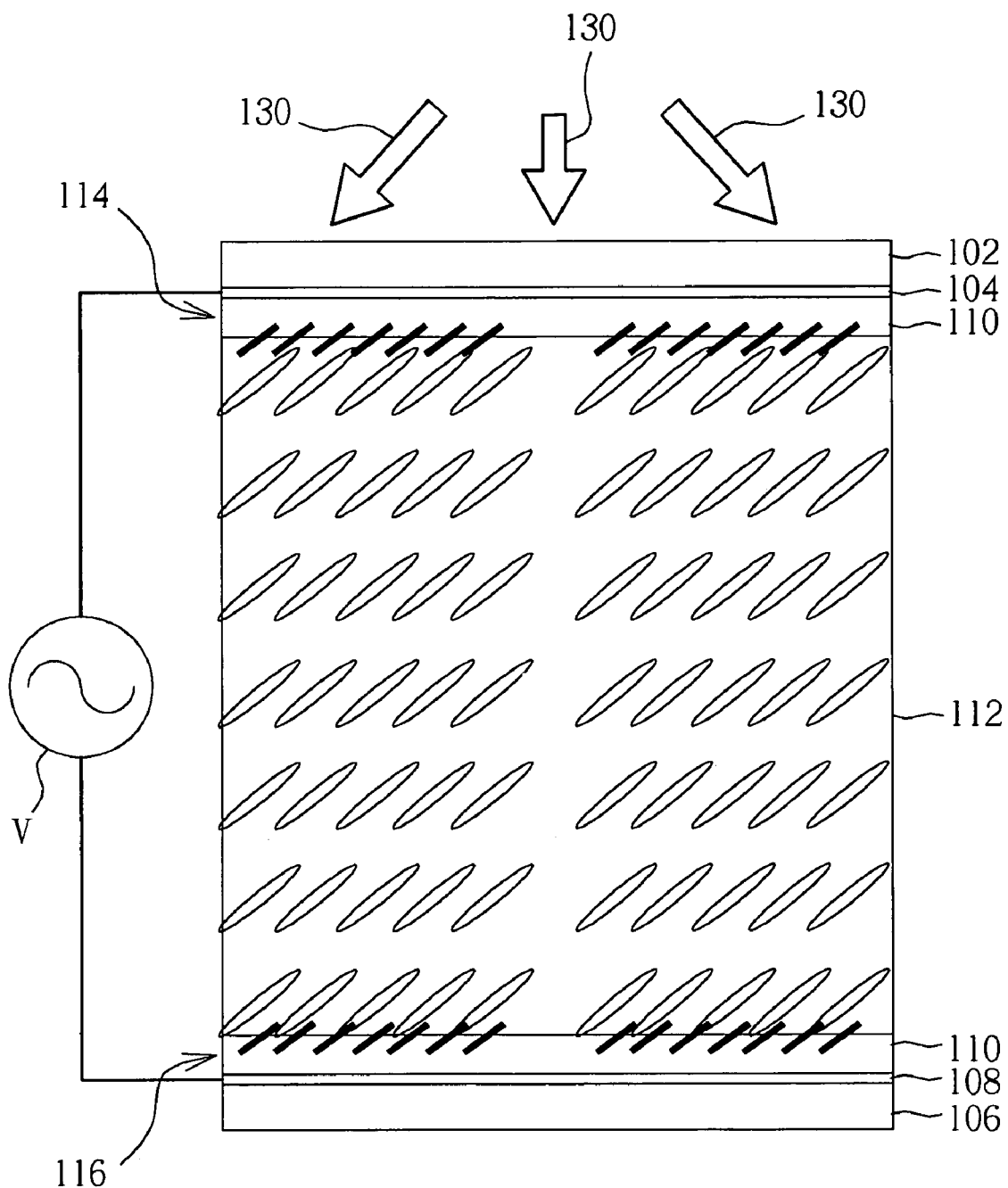
Figure 7:
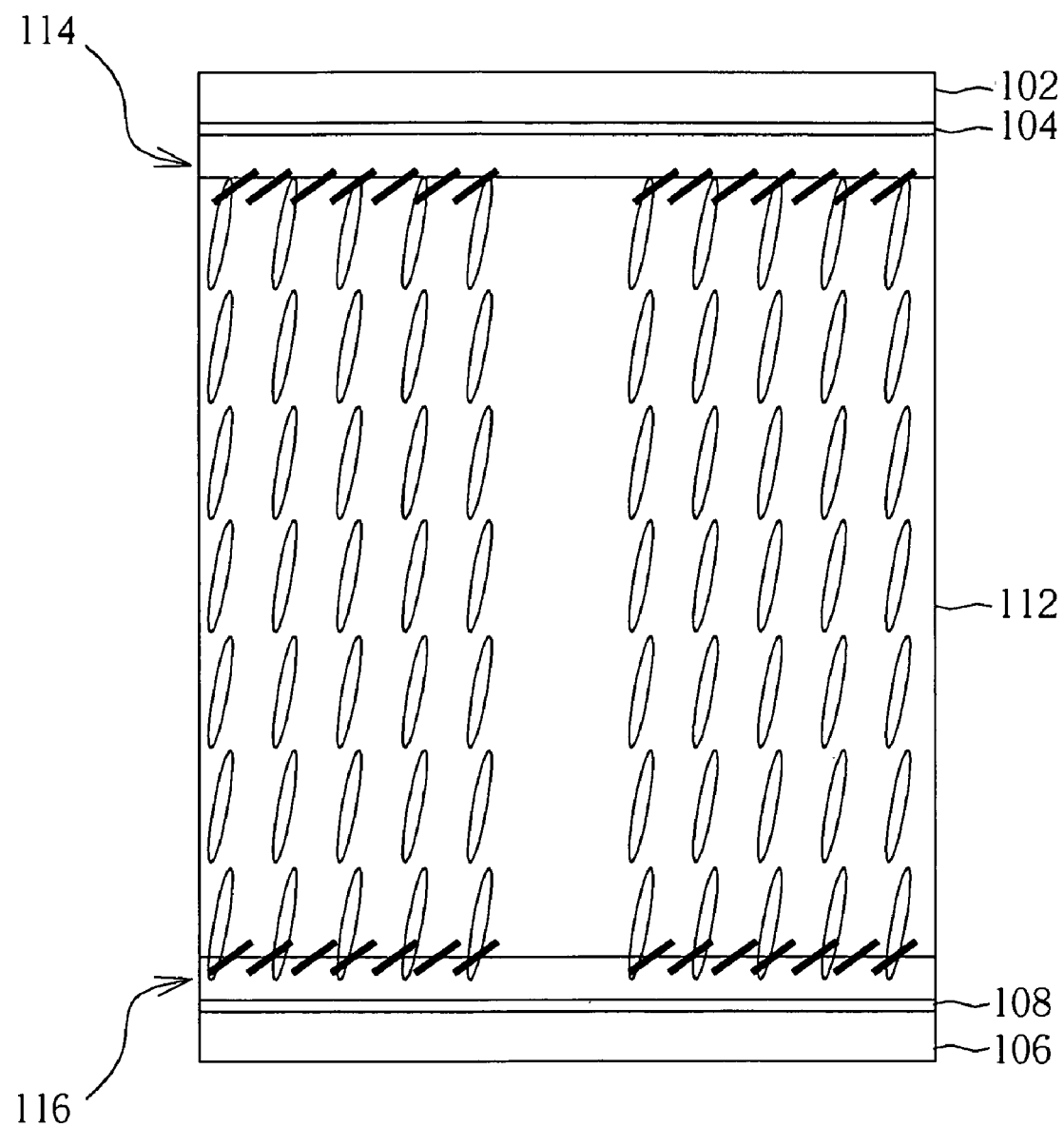

Referring to FIG. 5 through FIG. 7 schematically illustrate a method of forming a display panel in accordance with one preferred embodiment of the present invention, where like numbered numerals designate similar or the same parts, regions or elements. It is to be understood that the drawings are not drawn to scale and are served only for illustration purposes. As shown in FIG. 5, a first substrate 102 is provided. The first substrate 102 has a transparent electrode 104 disposed on the inner side as an inner surface. Subsequently, a second substrate 106 is provided. The second substrate 106 corresponds to the first substrate 102, the second substrate 106 has a pixel electrode 108 disposed on the inner side as an inner surface, and the pixel electrode 108 facing to the first substrate 102. In other words, the inner surface of the first substrate 102 faces to the inner surface of the second substrate 106. Thereafter, an alignment material 110 is provided to cover at least one of the transparent electrode 104 and the pixel electrode 108 by a coating process for example. Next, a photoelectric twisting layer 112 is provided between the first substrate 102 and the second substrate 106 to from a display panel. The display panel formed in this step may be regarded as a finished product panel. In other words, the first substrate 102 or the second substrate 106 is not taken apart from another nor tore down in the following manufacturing processes, and no re-assembling step is needed. In the present invention, the alignment material 110 is radiation-polymerizable, and the photoelectric twisting layer 112 includes non-radiation-polymerizable materials (or namely, the photoelectric twisting layer 112 does not include radiation-polymerizable materials). At this time without a voltage difference, the alignment material 110 presents in a non-aligned state (non-twisted state, non-ordered state, non-modulated state, or original state). It is preferred in this embodiment that the alignment material 110 may cover surfaces of both the transparent electrode 104 and the pixel electrode 108, and that alignment films may be formed on both the first substrate 102 and the second substrate 106 simultaneously by the molecule-inducing technology, but the present invention should not be limited to this embodiment. In other words, the alignment material 110 may be formed on at least one of the first substrate 102 and the second substrate 106.

The alignment material 110 may include siloxane materials, such as a polyimide (PI) material, and the included material has at least a polymerizable function group. The photoelectric twisting layer 112 may include any material that may twist, rotate, or drive according to the electric field or the magnetic field around. Preferably, the photoelectric twisting layer 112 may include a material that can also change or twist the polarizing direction of the polarized light. For example, the photoelectric twisting layer 112 is preferably the liquid crystal layer used for controlling the display of each pixel (the liquid crystal layer of the product panel) or just a material layer or a sacrificial layer consisting essentially of liquid crystal molecule or other suitability materials. It is preferred that the photoelectric twisting layer 112 may include a negative type liquid crystal material, which has a negative dielectric anisotropy value, such as a negative type nematic liquid crystal material, or more preferably a negative type nematic liquid crystal material that includes liquid crystal molecules perpendicular to the one of the two substrates (such as first substrate 102 and/or second substrate 106), but should not be limited thereto.

Thereafter, as shown in FIG. 6, a voltage difference V is applied between the transparent electrode 104 and the pixel electrode 108 to twist or drive a plurality of molecules of the photoelectric twisting layer 112, so that the molecules of the photoelectric twisting layer 112 induce (lead, help, or assist) a plurality of superficial molecules of the alignment material 110 to arrange in an ordered state. In other words, the molecules of the photoelectric twisting layer 112 induce the molecules of the alignment material 110 in the surface of the alignment material 110 to arrange in an ordered state (aligned state (twisted state, pre-tilt state, modulated state, or non-original state). The voltage difference V may be provided by applying different voltage to the transparent electrode 104 and the pixel electrode 108 respectively. An exposing process is carried out on the alignment material 110 at the time of applying the voltage difference V, so as to polymerize the alignment material 110 in the ordered state (aligned state (twisted state, pre-tilt state, modulated state, or non-original state), and to turn the alignment material 110 covering the transparent electrode 104 and the pixel electrode 108 into a first alignment film 114 and a second alignment film 116 respectively. Preferably, the exposing process is carried out on at least one of the alignment material 110 at the same time.

Because the twisted molecules of the photoelectric twisting layer 112 induces the superficial molecules of the alignment material 110 to align in the ordered state (aligned state, twisted state, pre-tilt state, modulated state, or non-original state), the light 130 of the exposing process is no longer limited to polarized light or parallel light. As a result, the exposing process preferably includes utilizing non-parallel ultraviolet light or non-polarized light as the light 130 to radiate the alignment material 110, but should not be limited thereto. The power of light source is substantially less than or equal to 100 milli-joule each second (mJ/s) in this embodiment of the present invention. For example, the exposing process preferably provides ultraviolet light with a power in a range from about 75 mJ/s to about 80 mJ/s for a time period about 1 to 2 seconds on the alignment material 110. The exposing time period is not limited to a specific case, and may be adjusted according to the composition of the alignment material 110 and/or the power of light source. In addition, the superficial molecules the alignment material 110 may be oriented toward the same direction with the molecules of the photoelectric twisting layer 112, but not limited thereto. For example, the superficial molecules the alignment material 110 may also be oriented toward a direction, which is opposite to the molecules of the photoelectric twisting layer 112. In other words, the orientation of the superficial molecules the alignment material 110 directs substantially different from the orientation of molecules of the photoelectric twisting layer 112 for about 180 degrees. Accordingly, an optical system for providing polarized light or parallel light is not necessary in the exposing process of the present invention, and the equipment cost is therefore effectively degreased.

The voltage difference V in the exposing process may be any value to adjust the direction of the molecules in the photoelectric twisting layer 112. According to experiment data of the present invention, the voltage difference V applied in the exposing process is preferably and substantially larger than or equal to 200% of a maximum driving voltage for displaying the photoelectric twisting layer 112, so as to effectively control the twist of the photoelectric twisting layer 112 and to provide a preferred alignment and a preferred tilt angle. The maximum driving voltage for displaying the photoelectric twisting layer is a required driving voltage difference between the pixel electrode and the transparent electrode to twist the photoelectric twisting layer 112 for displaying gray value of 0 or a gray value of 255, if the gray value of the display panel is arranged from 0 to 255 scales. For instance, if the maximum driving voltage for displaying the photoelectric twisting layer 112 is substantially in a range from 5 volts to 6 volts, the voltage difference V in the exposing process may be more than or equal to 10 volts, preferably may be in a range from 15 volts to 20 volts, and more preferably may be larger than 25 volts. In other words, the voltage difference V applied in the exposing process is preferably and substantially larger than or equal to 200% of a maximum driving voltage for displaying the photoelectric twisting layer 112, but should not be limited thereto. The voltage difference V is preferably to make molecules of the photoelectric twisting layer 112 twist for an angle more 0 and less than 80 degrees, so that a proper pre-tilt angle can be formed in the alignment material 110.

As shown in FIG. 7, the superficial molecules of the first alignment film molecule 114 and the second alignment film 116 therefore may keep in the ordered state without applying the voltage difference. Preferably, the aligning direction of the first alignment film 114 may substantially different from the aligning direction of the second alignment film 116. In addition, since the photoelectric twisting layer 112 is preferably just the liquid crystal layer for display, a panel-cutting process, a polarizer-attaching process on the outer surfaces of the first substrate 102 and the second substrate 106, etc. (not shown in the drawings) may be thereafter performed to form a display panel (finished product panel) of the present invention. Furthermore, at least a driving device or driving element may be electrically connected to the display panel, a assembling process (such as the panel disposed into a case) is carried out on the display panel, and so on (not shown) to form a display device.

Figure 8:
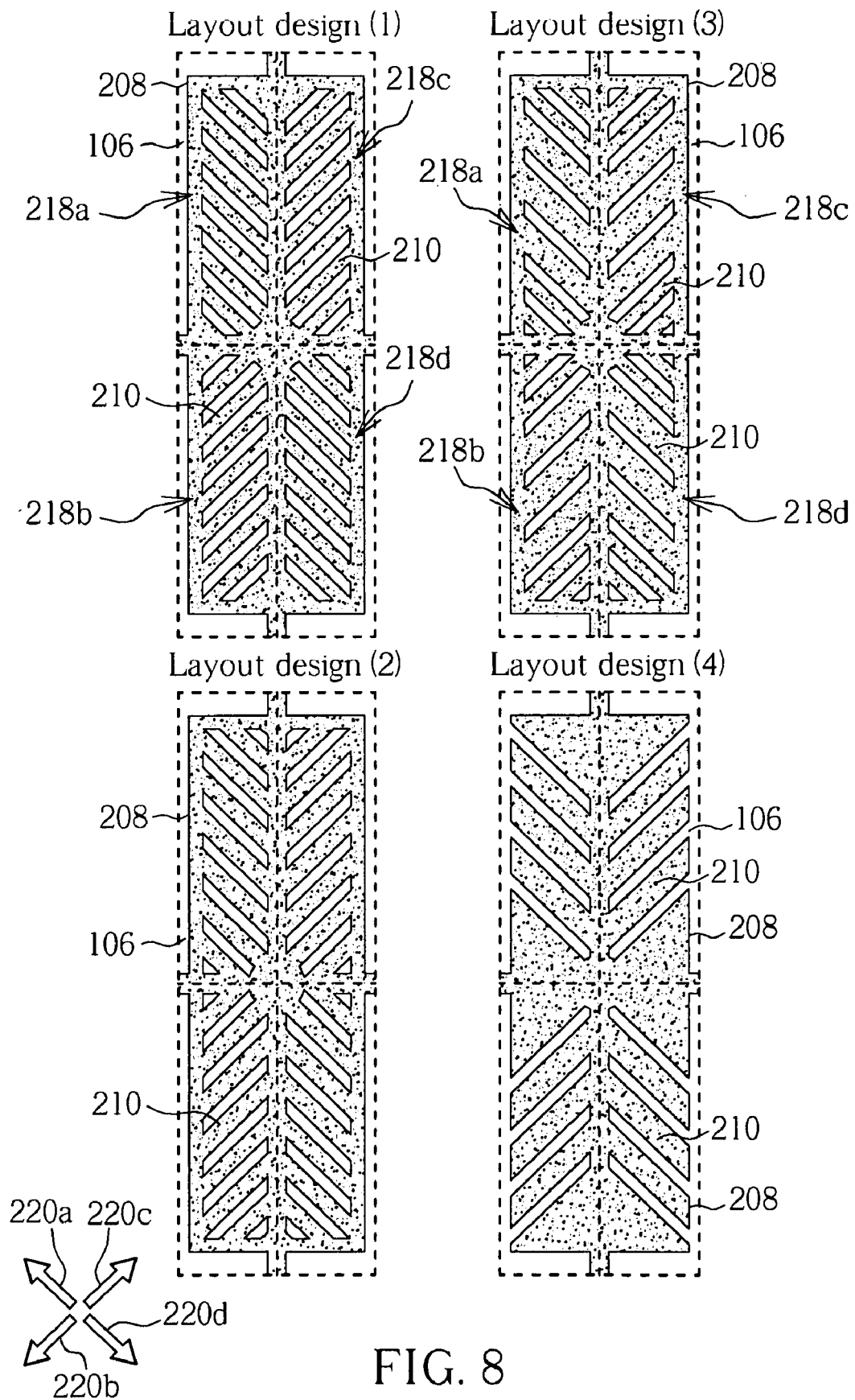
FIG. 8 and FIG. 9 schematically illustrate a method of forming a display panel in accordance with another preferred embodiment of the present invention.
Figure 9:
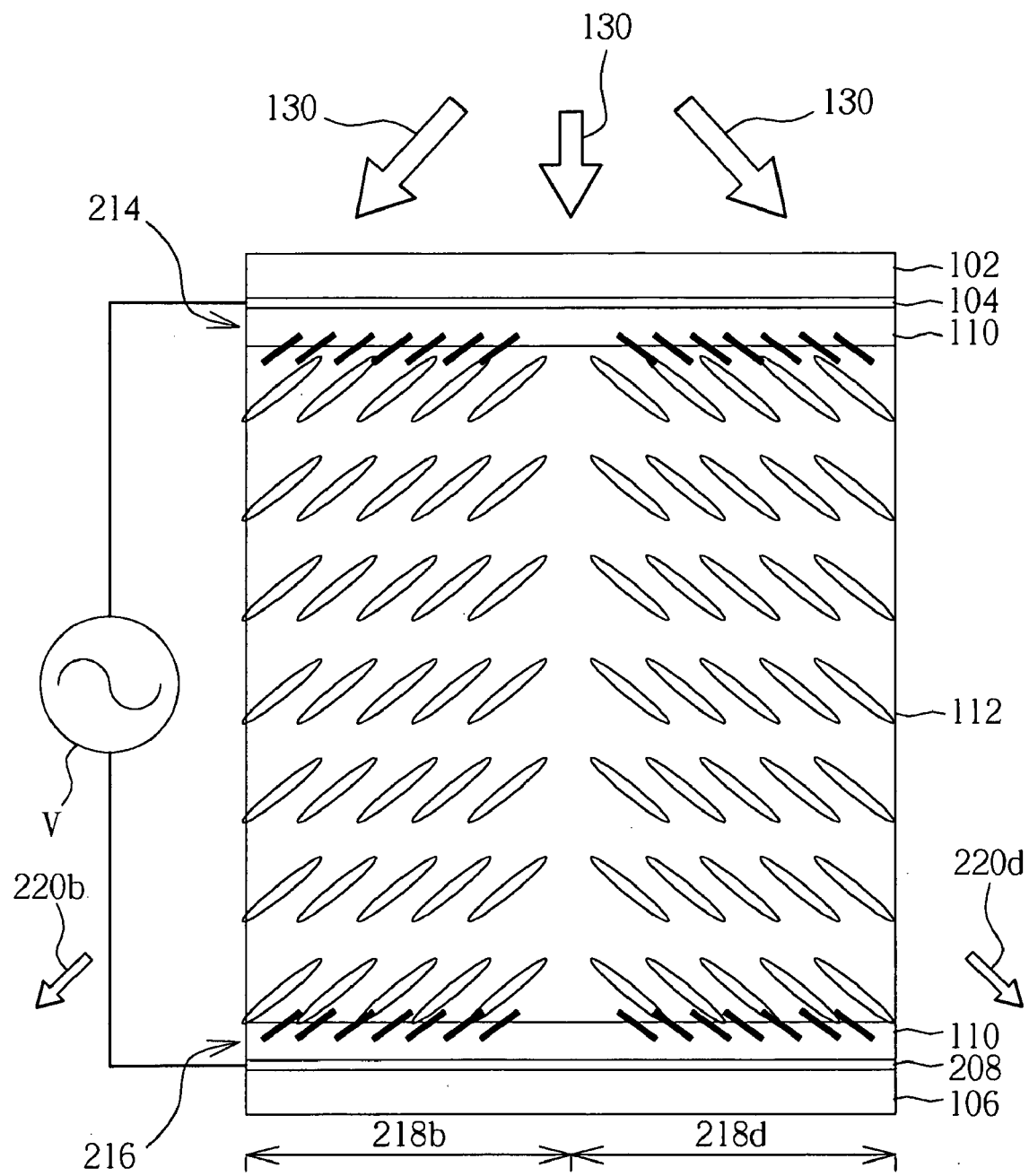

Pattern of the electrode may assist in controlling the twist of the photoelectric twisting layer 112 in the present invention. Accordingly, pattern of the electrode may further induce molecules of a photoelectric twisting layer 112 disposed in different regions to twist toward different directions, and therefore form an alignment film having different aligning directions in different regions. Referring to FIG. 8 and FIG. 9 schematically illustrate a method of forming a display panel in accordance with another preferred embodiment of the present invention.

Four layout patterns of patterned pixel electrodes are shown in FIG. 8. For each of the said patterned pixel electrodes, a plurality of regions may be defined in each pixel, and the different regions of the alignment film may have different aligning directions. As a result, this embodiment is preferably applied to MVA LCD panel. As shown in FIG. 8, at least a first alignment region 218a, at least a second alignment region 218b, at least a third alignment region 218c and at least a fourth alignment region 218d are defined on the second substrate 106. The pixel electrode of the second substrate 106 preferably include a patterned pixel electrode 208, and portions of the patterned pixel electrode 208 disposed in the different alignment regions preferably have different pattern aligning designs. The electrode strip portions 210 disposed in the first, second, third and fourth alignment regions 218a, 218b, 218c, 218d parallels the first, second, third and fourth direction 220a, 220b, 220c, 220d respectively. The pixel electrode includes a plurality of slits disposed between the electrode strip portions 210. Nevertheless, the present invention is not limited to the above-mentioned four layout patterns, and may include any designs, which may assist in controlling the twist of the photoelectric twisting layer.

As shown in FIG. 9, a voltage difference is applied between the transparent electrode 104 and the patterned pixel electrode 208 to twist molecules of the photoelectric twisting layer 112, so that the molecules of the photoelectric twisting layer 112 induce superficial molecules of the alignment material 110 to arrange in an ordered state (aligned state, twisted state, pre-tilt state, modulated state, or non-original state). Because portions of the patterned pixel electrode 208 disposed in the first, second, third, and fourth alignment regions

218a, 218b, 218c, 218d (the first and third alignment regions 218a, 218c are not shown in FIG. 9) are aligned toward different directions, molecules of the photoelectric twisting layer 112 disposed in the first, second, third, and fourth alignment regions 218a, 218b, 218c, 218d may tilt different toward different directions. Accordingly, superficial molecules of the alignment material 110 disposed in the first, second, third, and fourth alignment regions 218a, 218b, 218c, 218d are induced to arrange in four ordered states respectively, and the four ordered states are tilt toward four different directions. An exposing process is carried out on the alignment material 110 at the time of applying the voltage difference to polymerize the alignment material 110 in the four ordered states, and to turn the alignment material 110 covering the transparent electrode 104 and the patterned pixel electrode 208 into a first alignment film 214 and a second alignment film 216 respectively. Portions of the first alignment film 214 disposed in different alignment regions have different pre-tilt angles, and so does the second alignment film 216. Preferably, the exposing process is carried out on at least one of the alignment material 110 in different regions at the same time.

In other embodiments, other methods may be adopted in the present invention to induce molecules of a photoelectric twisting layer 112 disposed in different regions to twist toward different directions, and therefore form an alignment film having different aligning directions in different regions. For example, different voltage differences may be applied to the photoelectric twisting layer 112 disposed in different regions, so molecules of the photoelectric twisting layer 112 may twist toward different directions according to the related electric fields.

In the above-mentioned embodiment, it is preferred that the alignment material 110 may cover surfaces of both the transparent electrode 104 and the pixel electrode 108, and that photo alignment films may be formed on both the first substrate 102 and the second substrate 106 simultaneously by the molecule-inducing technology, but the present invention should not be limited to this embodiment. In other embodiments, the aforementioned photo alignment film may be formed only on the first substrate 102 or the second substrate 106, and another alignment film may be formed on the other substrate by other technology, such as a non-exposing process, or another photo alignment film may be thereafter formed on the other substrate.

Figure 10:
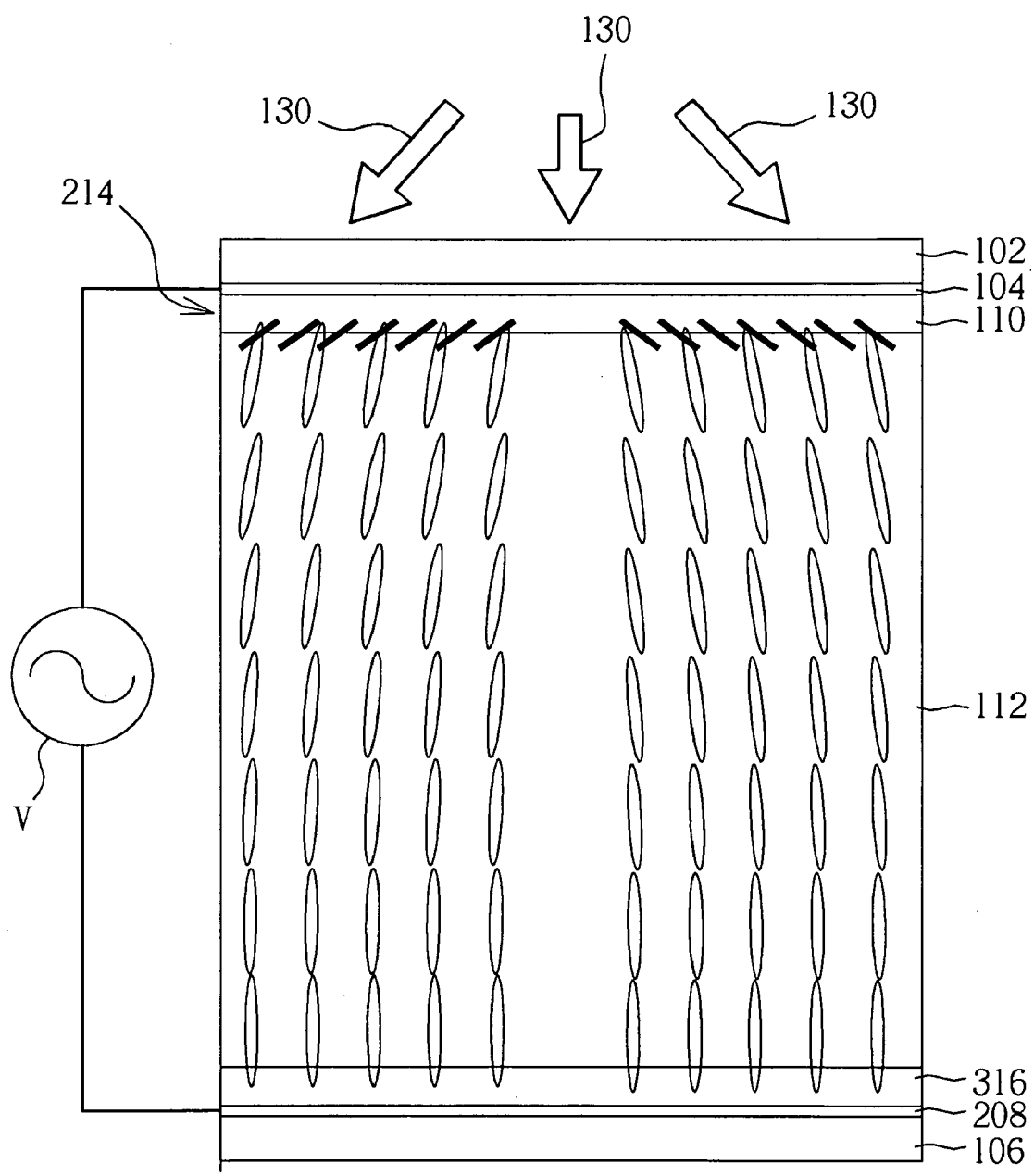
FIG. 10 schematically illustrates a method of forming a display panel in accordance with still another preferred embodiment of the present invention.

Referring to FIG. 10 schematically illustrates a method of forming a display panel in accordance with still another preferred embodiment of the present invention. As shown in FIG. 10, the second substrate 106 of this embodiment preferably includes the second alignment film 316 covering the pixel electrode 208, and the second alignment film 316 is already in an ordered state (aligned state, twisted state, pre-tilt state, modulated state, or non-original state) before the step of inducing molecule by the photoelectric twisting layer 112 and before the exposing process. The ordered state of the second alignment film 316 may be formed by performing an alignment process first or may be formed without any alignment process.

Preferably, the ordered state of the second alignment film 316 is formed without any alignment process, and the second alignment film 316 may induce the photoelectric twisting layer 112, such as a liquid crystal layer, by its material characteristics. For example, if the photoelectric twisting layer 112, such as a liquid crystal layer, are in vertical alignment mode (VA mode), the second alignment film 316 may also be in the VA mode or the similar, so the longitudinal axis of the molecules of the photoelectric twisting layer 112 (such as a liquid crystal layer) adjacent to the second alignment film 316 is substantially perpendicular to the surface of the second alignment film 316. In other words, the second alignment film 316 may be selected according to the mode of the photoelectric twisting layer 112, so to induce the photoelectric twisting layer 112.

It is suboptimal that the ordered state of the second alignment film 316 is formed by an alignment process, such as a non-exposing process including a rubbing alignment treatment, ion bombardment, neutron bombardment, or atom bombardment. In addition, the alignment direction of the first alignment film 114 is preferably and substantially different from the alignment direction of the second alignment film 316. Furthermore, an alignment material 110 is provided to cover the transparent electrode 104 of the first substrate 102, and next a voltage difference V is applied between the transparent electrode 104 and the pixel electrode 208 to twist molecules of the photoelectric twisting layer 112, so that the molecules of the photoelectric twisting layer 112 induce superficial molecules of the alignment material 110 to arrange in an ordered state. An exposing process is carried out on the alignment material 110 at the time of applying the voltage difference V to polymerize the alignment material 110 in the ordered state (aligned state, twisted state, pre-tilt state, modulated state, or non-original state), and to turn the alignment material 110 covering the transparent electrode 104 into a first alignment film 214. Preferably, the exposing process is carried out on the alignment material 110 at the same time.

Moreover, since the second substrate 106 includes some elements, such as the pixel electrode 108, which may affect the arrangement or twist of molecules of the photoelectric twisting layer 112, the electric field and the superficial profile provided by these elements (such as the pixel electrode 108) may assist in controlling the molecule-twist of the photoelectric twisting layer 112. Thus, the second alignment film 316 shown in FIG. 10 may be optional or omitted in some embodiments. In some case, the second substrate 106 does not include the second alignment film 316, an electric field, which is coursed by a voltage difference V applied to the pixel electrode 208 of the second substrate 106, may directly induce the molecules of the photoelectric twisting layer 112 to regular twist toward the predetermined direction. Simultaneously, an exposing process is performed on the alignment material 110 induced by the twisted molecules of the photoelectric twisting layer 112 to form the photo alignment film 214. Preferably, the exposing process is carried out on the alignment material 110 at the same time. It should be noted that an alignment film, which is in the same mode with the photoelectric twisting layer 112, may be provided on the pixel electrode 108 to assist the molecule-twist of the photoelectric twisting layer 112 in such a case before filling the photoelectric twisting layer 112 between the first substrate 102 and the second substrate 106. The related steps, methods, and characterizations of forming such an alignment film in the same mode are mentioned above, and are omitted here. In other embodiments, an alignment film, which is already in an ordered state (aligned state, twisted state, pre-tilt state, modulated state, or non-original state), may be provided on the pixel electrode 108 to assist the molecule-twist of the photoelectric twisting layer 112 in such a case before filling the photoelectric twisting layer 112 between the first substrate 102 and the second substrate 106. The related steps, methods, and characterizations of forming such an alignment film in an ordered state are mentioned above, and are omitted here.

In other embodiments, the said second alignment film 316 may be disposed on the transparent electrode 104 of the first substrate 102, the molecules of the photoelectric twisting layer 112 induce superficial molecules of the alignment material 110 to arrange in an ordered state, and an exposing process is carried out to form a first alignment film 114 or a first alignment film 214 on the pixel electrode 108 of the second substrate 106.

In comparison with the above-mentioned embodiments, only one photo alignment film (the first alignment film 114) is formed on the second substrate 106 in this embodiment, and the fabricated display panel of this embodiment may has a higher contrast value than the display panel, which includes two photo alignment films (the first alignment film 114 and the second alignment film 116) on the two substrates (TFT substrate and CF substrate) respectively. Moreover, the turn-off response time of the fabricated display panel of this embodiment may be shorter than the turn-off response time of the display panel, which includes two photo alignment films on the two substrates respectively. On the other hand, the processes of manufacturing the display panel, which includes two photo alignment films on the two substrates respectively, may be simpler, and the turn-on response time of the display panel, which includes two photo alignment films on the two substrates respectively, than the turn-on response time of the display panel, in which only one photo alignment film (the first alignment film 114) is formed on the second substrate 106. Therefore, the display panel, in which two photo alignment films are formed on the two substrates respectively, is more suitable to the LCDs of low gray vale.

Furthermore, the position of the color filter (CF) may be adjusted or integrated according to various embodiments of the present invention. The color filter of the display panel may be formed on/in the first substrate 102 or the second substrate 106 (not shown in the drawings). If the color filter layer is formed on the first substrate 102, the TFT array layer may be disposed on the second substrate 106, and faces the color filter layer. In other embodiments, a TFT array layer and a color filter layer may be integrated on/in the second substrate 106 in the present invention, to form an integrated structure, such as a color on array (COA) structure or an array on color (AOC) structure. The present invention should not be limited to the structures of the aforementioned display panel, and the actual display panel of the present invention may include other components, elements, or devices according to the needed display performance.

Figure 11:
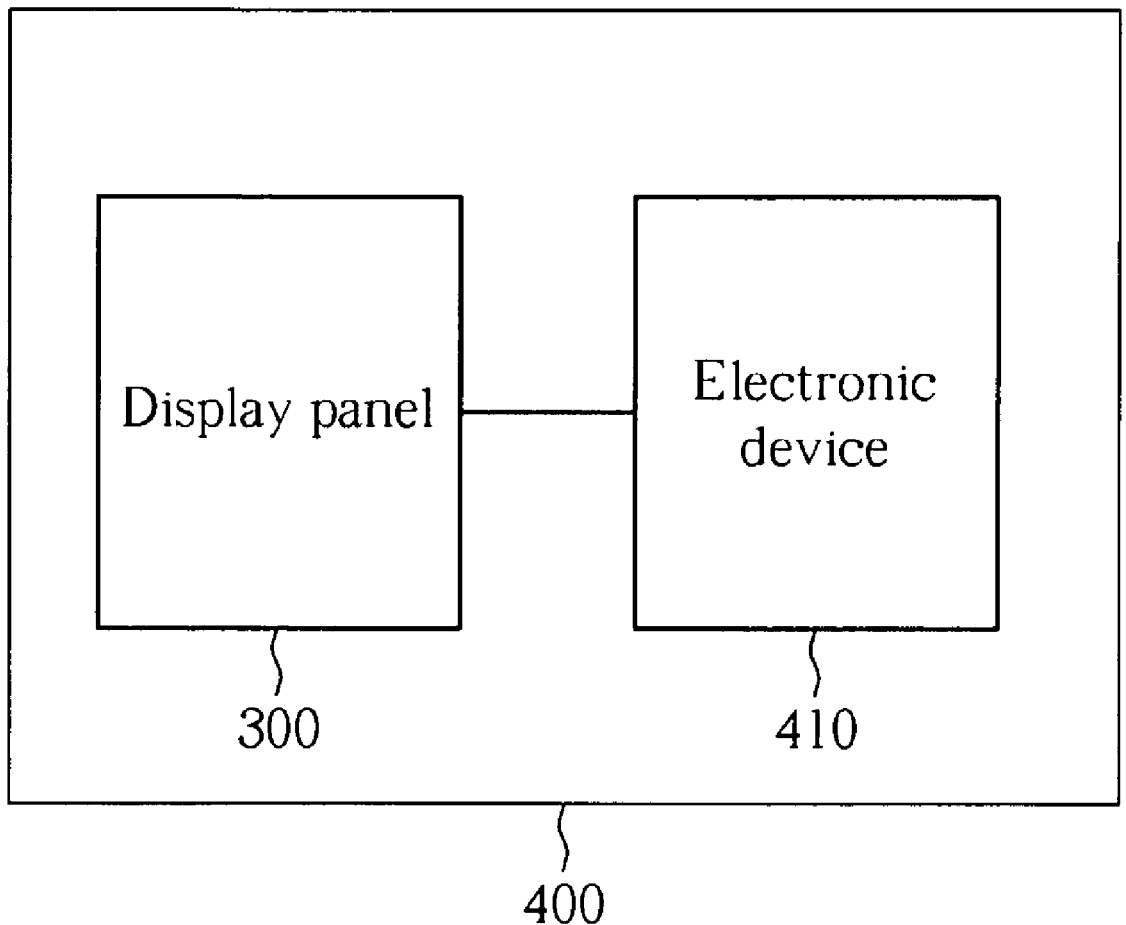
FIG. 11 schematically illustrates a method of forming an electro-optical device in accordance with a preferred embodiment of the present invention.

According to the above-mentioned methods of forming the display panels, the present invention may further provide a method of forming an electro-optical device. Referring to FIG. 11 schematically illustrates a method of forming an electro-optical device in accordance with a preferred embodiment of the present invention. As shown in FIG. 11, a display panel 300 may first be formed according any of the aforementioned methods of forming the display panels, the display panel 300 is thereafter electrically connected to an electronic device 410 for controlling the performance of the display panel 300, and at least a proper assembling process is afterward carried out to form an electro-optical device 400.

The LCD described by the above-mentioned embodiments can be combined with an electronic device 410 to form an electro-optical device 90. The electronic device 410 includes a control device, operating device, processing device, input device, memory device, driving device, illuminating device, protecting device, sensing device, detecting device, other functional devices, or a combination thereof. The types of the electro-optical device 400 include of a portable product (such as a cell phone, a video camera, a camera, a notebook, a video player, a watch, a music player, an E-mail transceiver, a map navigator, a digital photo-frame, global positioning system (GPS) or a similar product thereto), a video product (such as a video player or a product similar thereto), a monitor, a television, a indoor/outdoor signboard, a display panel in projectors, etc.

According to the actual testing result, the alignment film of the present invention may effectively shorten the response time of controlling the liquid crystal layer. Referring to FIG. 12 schematically illustrates a comparison table showing the response time test result of the alignment films formed in the present invention. The layout design (1), layout design (2), layout design (3) and layout design (4) shown in the table indicate the four layout patterns of patterned pixel electrodes as an example shown in FIG. 8 respectively, and all the tested alignment films are formed by the methods of the present invention. The exposing processes of the test sample (1) and the test sample (2) are performed with the above-mentioned power of the embodiments. Accordingly, the exposing processes are performed with a power substantially smaller than or equal to 100 milli-joule per second (milli-Joule/sec). For example, the exposing processes may preferably radiate ultraviolet light with a power substantially in a range from about 75 milli-Joule/sec to about 80 milli-Joule/sec on the alignment material 110 for about 1 second to 2 seconds. Time of exposing the alignment material may be adjusted according to kinds of the alignment material and/or the power of light without particular restriction. As shown in FIG. 12, the alignment films may effectively shorten the response time of controlling the liquid crystal layer, no matter the alignment films are formed by exposing for about 1 second or about 2 seconds.

Since the superficial molecules the alignment material 110 may be self-aligned to the molecules of the photoelectric twisting layer, such as a liquid crystal layer, and the alignment material 110 is polymerized in the ordered state by an auto exposing process in the present invention, an optical system for providing polarized light or parallel light is not necessary in the exposing process of the present invention, and the equipment cost is therefore effectively degreased.

In addition, since the patterned electrode may induce molecules of a photoelectric twisting layer, such as a liquid crystal layer, disposed in different regions to twist toward different directions, and therefore form an alignment film having different aligning directions in different regions, multi-domain alignment may automatically formed by the exposing process in the present invention. Preferably, the exposing process is carried out on the alignment material at the same time. Thus, the present invention not only can shorten the time of manufacturing products, but also can simplify the process complexity, and save the cost of photo masks. Moreover, the product structure and the product design are no more limited by the precision of radiating the light, the precision of orient the exposing target, and the precision of aligning the photo mask in the exposing process. Besides, sine the photoelectric twisting layer used by the present invention may just be the liquid crystal layer used for controlling the display of each pixel (the liquid crystal layer of the product panel), the step of forming the alignment film may be effectively integrated in the processes of forming a display panel without increasing the process complexity.

Those skilled in the art will readily observe that numerous modifications and alterations of the device and method may be made while retaining the teachings of the invention.

What is claimed is:
1. A method of forming a display panel, comprising:
   providing a first substrate having a transparent electrode thereon as an inner surface;

providing a second substrate having a pixel electrode thereon as an inner surface and corresponding to the first substrate;

forming an alignment material covering one of the transparent electrode and the pixel electrode, the alignment material being radiation-polymerizable and in a non-aligned state;

providing a photoelectric twisting layer between the first substrate and the second substrate, the photoelectric twisting layer comprising non-radiation-polymerizable materials;

applying a voltage difference between the transparent electrode and the pixel electrode to twist a plurality of molecules of the photoelectric twisting layer, so that the molecules of the photoelectric twisting layer induce a plurality of superficial molecules of the alignment material to arrange in an ordered state; and performing an exposing process on the alignment material to polymerize the alignment material in the ordered state and to turn the alignment material into a first alignment film, wherein the superficial molecules of the first alignment film molecule keep in the ordered state without applying the voltage difference.

2. The method of claim 1, wherein the exposing process comprises utilizing non-parallel ultraviolet light to radiate the alignment material.

3. The method of claim 1, wherein the exposing process comprises utilizing non-polarized light to radiate the alignment material.

4. The method of claim 1, wherein the second substrate comprises at least a first alignment region and at least a second alignment region, and the molecules of the photoelectric twisting layer disposed in the first and the second alignment regions are tilted in substantially different directions in the step of applying the voltage difference.

5. The method of claim 4, wherein the pixel electrode comprises at least a patterned pixel electrode, the patterned pixel electrode comprises a plurality of electrode strip portions, each of the electrode strip portions disposed in the first alignment region parallels a first direction, each of the electrode strip portions disposed in the second alignment region parallels a second direction, and the pixel electrode comprises a plurality of slits disposed between the electrode strip portions.

6. The method of claim 1, wherein the voltage difference applied in the exposing process is substantially larger than or equal to 200% of a maximum driving voltage, which is applied to the photoelectric twisting layer for displaying.

7. The method of claim 1, wherein the second substrate comprises a second alignment film covering on the pixel electrode before the exposing process, and the second alignment film is in an ordered state, which is formed by a non-exposing process or not formed by an alignment process.

8. The method of claim 7, wherein an arranged direction of the ordered state of the first alignment film is substantially different from an arranged direction of the ordered state of the second alignment film.

9. The method of claim 1, wherein the first and the second substrates comprises the alignment material covering the transparent electrode and the pixel electrode respectively before the exposing process, and the exposing process comprises polymerizing the alignment material on the transparent electrode and the pixel electrode to the first alignment film and a second alignment film respectively.

10. The method of claim 9, wherein an arranged direction of the ordered state of the first alignment film is substantially different from an arranged direction of an ordered state of the second alignment film.

11. A method of forming an electro-optical device, comprising the method of claim 1.

* * * * *